US009251092B2

(12) United States Patent
Bybell et al.

(10) Patent No.: US 9,251,092 B2
(45) Date of Patent: *Feb. 2, 2016

(54) HYBRID ADDRESS TRANSLATION

(71) Applicant: International Business Machines Corporation, Armonk, NY (US)

(72) Inventors: Anthony J. Bybell, Chapel Hill, NC (US); Michael K. Gschwind, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/783,791

(22) Filed: Mar. 4, 2013

(65) Prior Publication Data

US 2013/0262815 A1   Oct. 3, 2013

Related U.S. Application Data

(63) Continuation of application No. 13/432,381, filed on Mar. 28, 2012.

(51) Int. Cl.
*G06F 12/10* (2006.01)
*G06F 12/02* (2006.01)

(52) U.S. Cl.
CPC ........ *G06F 12/1027* (2013.01); *G06F 12/1018* (2013.01); *G06F 12/1036* (2013.01); *G06F 12/0292* (2013.01); *G06F 2212/1016* (2013.01);
(Continued)

(58) Field of Classification Search
CPC ............ G06F 12/0864; G06F 12/1018; G06F 12/1027
See application file for complete search history.

(56) References Cited

U.S. PATENT DOCUMENTS

| 5,390,173 A | * | 2/1995 | Spinney et al. | 370/401 |
| 5,426,750 A | * | 6/1995 | Becker et al. | 711/207 |
| 5,873,123 A | * | 2/1999 | Patel et al. | 711/202 |

(Continued)

FOREIGN PATENT DOCUMENTS

WO    WO9821712 A2    5/1998

OTHER PUBLICATIONS

Thomas W. Barr et al., "Translation Caching: Skip, Don't Walk (the Page Table)," ISCA'10, Jun. 19-23, 2010, Saint-Malo, France, pp. 48-59.

(Continued)

*Primary Examiner* — Christian P Chace
*Assistant Examiner* — Leandro Villanueva
(74) *Attorney, Agent, or Firm* — Cantor Colburn LLP; William A. Kinnaman, Jr.

(57) ABSTRACT

Embodiments of the invention relate to hybrid address translation. An aspect of the invention includes receiving a first address, the first address referencing a location in a first address space. The computer searches a segment lookaside buffer (SLB) for a SLB entry corresponding to the first address; the SLB entry comprising a type field and an address field and determines whether a value of the type field in the SLB entry indicates a hashed page table (HPT) search or a radix tree search. Based on determining that the value of the type field indicates the HPT search, a HPT is searched to determine a second address, the second address comprising a translation of the first address into a second address space; and based on determining that the value of the type field indicates the radix tree search, a radix tree is searched to determine the second address.

8 Claims, 8 Drawing Sheets

(52) U.S. Cl.
CPC ..... *G06F 2212/651* (2013.01); *G06F 2212/684* (2013.01)

(56) References Cited

U.S. PATENT DOCUMENTS

| | | | |
|---|---|---|---|
| 5,946,679 A * | 8/1999 | Ahuja et al. | |
| 7,428,626 B2 | 9/2008 | Vega | |
| 7,809,921 B2 | 10/2010 | Davis | |
| 8,041,923 B2 | 10/2011 | Greiner et al. | |
| 2004/0210588 A1 | 10/2004 | Simkins et al. | |
| 2005/0193165 A1* | 9/2005 | Sakaguchi | G06F 12/0866 711/113 |
| 2006/0083247 A1* | 4/2006 | Mehta | 370/395.32 |
| 2006/0271540 A1* | 11/2006 | Williams | 707/7 |
| 2007/0101099 A1* | 5/2007 | Shinohara et al. | 711/207 |
| 2007/0283124 A1* | 12/2007 | Menczak et al. | 711/207 |
| 2008/0052486 A1* | 2/2008 | Davis | 711/206 |
| 2009/0094430 A1* | 4/2009 | Bergheaud et al. | 711/163 |
| 2009/0157975 A1 | 6/2009 | Sathaye et al. | |
| 2010/0030997 A1* | 2/2010 | Gupta et al. | 711/206 |
| 2010/0058026 A1* | 3/2010 | Heil et al. | 711/207 |
| 2011/0131388 A1* | 6/2011 | Chen et al. | 711/206 |
| 2013/0262815 A1 | 10/2013 | Bybell et al. | |
| 2013/0262817 A1* | 10/2013 | Bybell et al. | 711/208 |

OTHER PUBLICATIONS

Yuxin Bai et al., "Virtual Memory Management: TLB Prefetching & Page Walk," CSC456 Seminar, Nov. 3, 2011, 9 pages.

J. Huck, et al., "Architectural Support for Translation Table Management in Large Address Space Machines," Proceedings of the Annual International Symposium on Computer Architecture; May 16-19, 1993; pp. 39-50.

International Patent Application No. PCT/EP2013/053287; International Search Report and Written Report dated Jun. 28, 2013; 10 pages.

U.S. Appl. No. 13/432,381, filed Mar. 28, 2012; Non-Final Office Action dated Dec. 6, 2013; 31 pages.

\* cited by examiner

HYBRID ADDRESS TRANSLATION

CROSS-REFERENCE TO RELATED APPLICATION

This application is a continuation of U.S. application Ser. No. 13/432,381 (Bybell et al.), filed on Mar. 28, 2012, which is herein incorporated by reference in its entirety.

BACKGROUND

The present invention relates generally to computing systems, and more specifically, to computer addressing techniques.

In today's computer systems, the system memory is managed by the operating system, and is allocated to different software applications as needed. The different software applications may run in one or more partitions, and the one or more partitions may run different operating systems (OSs). Virtual memory techniques may be used in such a computer system to share the physical memory of the computing system among many processes and applications. The software applications therefore deal with effective addresses in a virtual memory space, which allow the applications to read, write, and execute when required, without being concerned with the actual physical memory locations where the operations are taking place. The applications rely on the operating system that underlies each application to perform the mapping from the effective address used by the application to a physical address in the computer memory. Address translation is the mechanism by which effective addresses that reference virtual memory are translated into real memory addresses. Address translation is a complex procedure that, if not implemented well, can end up on the critical path that determines the clock cycle of the processor.

When the CPU requests an effective address, the system first checks an effective-to-real address translation (ERAT) cache to determine a real address corresponding to the effective address. If the effective address is not in the ERAT cache, various other caches, including a segment lookaside buffer (SLB) and a translation lookaside buffer (TLB) may be checked to determine the real address corresponding to the effective address. The ERAT cache, SLB, and TLB hold data regarding translations for recently used effective addresses and are searched to provide necessary information for the address translation process. However, if the effective address is in none of these caches, an additional page table search must be performed in order to determine the correct translation of the effective address.

SUMMARY

Embodiments include a method for hybrid address translation. An aspect of the invention includes receiving a first address, the first address referencing a location in a first address space. The computer searches a segment lookaside buffer (SLB) for a SLB entry corresponding to the first address; the SLB entry comprising a type field and an address field and determines whether a value of the type field in the SLB entry indicates a hashed page table (HPT) search or a radix tree search. Based on determining that the value of the type field indicates the HPT search, a HPT is searched to determine a second address, the second address comprising a translation of the first address into a second address space; and based on determining that the value of the type field indicates the radix tree search, a radix tree is searched to determine the second address.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Embodiments of systems and methods for hybrid address translation are provided, with exemplary embodiments being discussed below in detail. Hybrid address translation allows different types of page tables, specifically a hashed page table (HPT) and a radix tree, to be used in a single computing system to achieve translation of a first address into a second address. The type of page table that is used for a particular address translation is based on the type of request and/or the OS that underlies the application that issued the address to be translated. HPT is preferred for sparse, random accesses over relatively large datasets, while radix tree is preferred for accesses with a high degree of spatial locality. Therefore, for example, data-side accesses in a large memory footprint application such as the database DB2 may be directed toward HPT, but instruction-side accesses may use radix tree. The hybrid address translation scheme allows the performance of different software applications running on a single computing system to be increased by using the particular type of address translation that is appropriate for each type of software application or memory access. In addition, address translation may also be performed across multiple discontiguous memory regions, and the radix tree search may allow multiple radix tree roots to be used, reducing the amount of time required to perform a radix tree translation.

In order to determine the type of page table search to use for a particular address translation, the SLB entries for each address include a respective type field indicating whether a HPT or radix tree search should be used for the particular address. The type field comprises a single bit, and may be included in any appropriate location in an SLB entry. Any appropriate type values may be used to indicate a radix tree or HPT search. In the discussion below, a type value of 0 indicates a HPT search and a type value of 1 indicates a radix tree search; however, this is for illustrative purposes only.

The SLB entries may also include radix tree pointers that are used to determine the root of a radix tree search. The SLB virtual space identifier (VSID) may be repurposed as the radix tree search root pointer. A radix tree pointer may comprise an address space identifier (ID) indicating a block of entries in the radix tree to be searched for the address. The size of the block of entries determines the number of levels of the radix tree to be searched; a block of entries having a larger size is higher up in the radix tree. Valid leaf entries in the radix tree indicate a page size corresponding to the level in the tree. The address space ID associated with an address may be stored in the SLB entry using any mechanism which extends an effective address beyond its natural size. Such an address extension can be as few as zero bits depending on software requirements. The address space ID may comprise a process identifier (PID), which may be an external PID, that is associated with the address in some embodiments. As a radix tree effective address is specified as 48 bits, effective addresses with the top 16 bits set to a value other than zero may be viewed as an implicit address space ID. Use of the address space ID in the SLB entry to indicate a radix tree search root allows searches across multiple discontiguous memory regions, without providing a radix tree covering the full address space. Trees walks can be of a shorter distance (for example, less than 4 steps) than a fully-specified radix tree which uses page table root pointers if more high-order bits of the effective address match. For example, software can specify more bits explicitly for frequently-encountered translations, or hardware can manage some number of SLB entries as a page walk cache, using a greedy algorithm to select the SLB that contains the largest number of matching high-order bits. In order to reduce the number of levels walked, the smallest segment size matching the SLB entry is used to initiate a radix tree walk. The address space ID may also prevent unnecessary TLB flushes by, for example, assigning different contexts to different address space IDs.

Hybrid address translation as is described with respect to FIGS. 1A-B and 2-6 below may be used for any type of address translation in a computing system, for example, input/output, partition-level, or partition to physical level. While FIGS. 1A-B and 2-6 are discussed below with reference to translating an effective address to a real address that indicates a physical location in a computer memory, the methods described in FIGS. 2-6 may be used to translate any type of first address in a first address space to any type of second address in a second address space for any level of address translation in various embodiments.

Figure 1A:
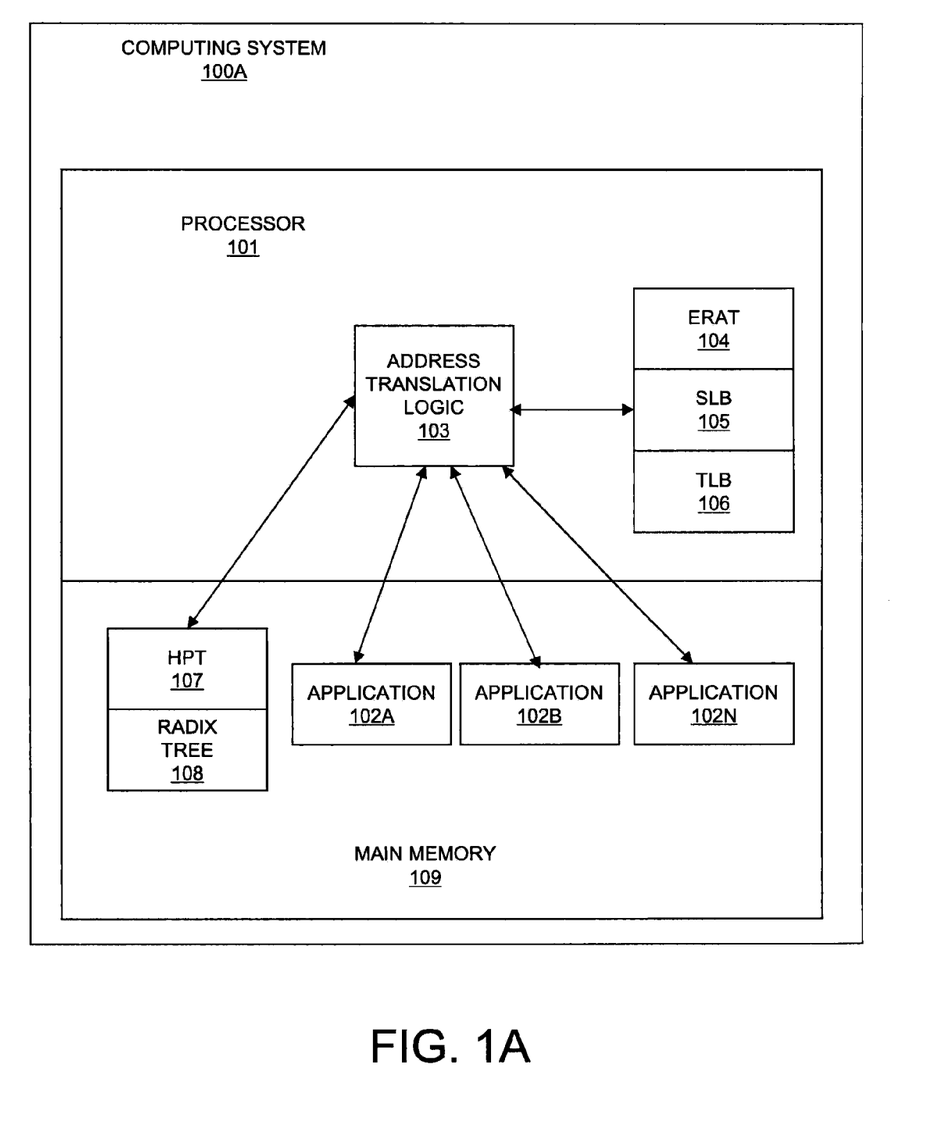
FIGS. 1A-B depicts a system for hybrid address translation in accordance with an embodiment.
Figure 1B:
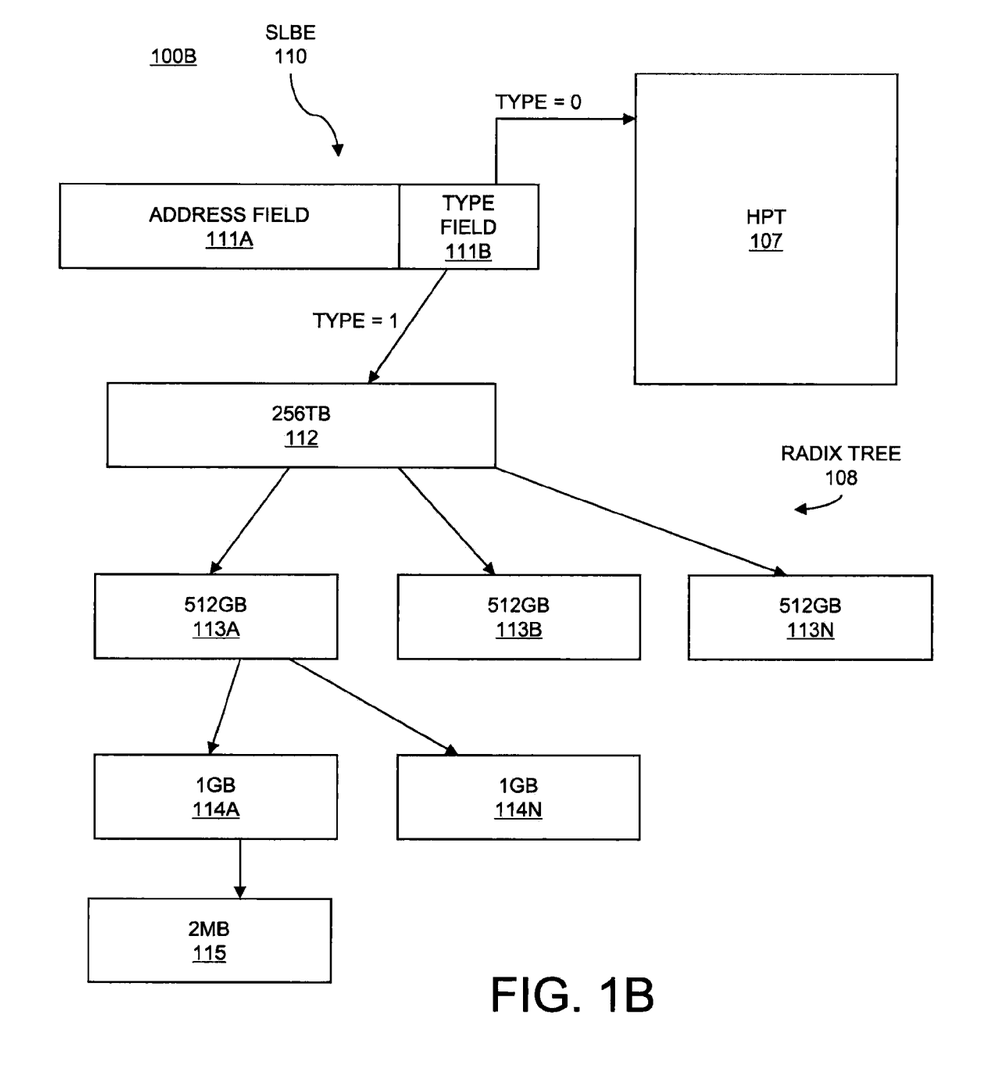

FIG. 1A shows an example computing system 100A including hybrid address translation, and FIG. 1B shows an embodiment of a system 100B for hybrid address translation including an SLB entry, HPT, and radix tree, that may be implemented in a computing system such as computing system 100A. Computing system 100A shown in FIG. 1A includes a processor 101 and a main memory 109. Address translation logic 103, ERAT cache 104, SLB 105, and TLB 106 are stored in the processor 101. A plurality of software applications 102A-N, HPT 107, and radix tree 108 are stored in the main memory 109. Each of the software applications 102A-N access specific locations in the main memory 109 via address translation logic 103. Effective addresses are issued by the software applications 102A-N, and the address translation logic 103 converts the effective address to a real address that may be used to access locations in the main memory 109. Address translation logic 103 searches various caches, including ERAT cache 104, SLB 105, and TLB 106, in addition to HPT 107 and radix tree 108, in order to perform address translations. ERAT cache 104 may comprise a content addressable memory (CAM) in some embodiments. SLB 105 includes a plurality of SLB entries, each corresponding to an effective address. The TLB 106 holds a plurality of real address translations corresponding to virtual addresses.

Turning to FIG. 1B, an example SLB entry 110 is shown, including an address field 111A and a type field 111B. SLB entry 110 may be stored in SLB 105 of FIG. 1A. The type field 111B indicates whether the effective address stored in the address field 111A in the SLB entry 110 should be searched in HPT 107 (e.g., type=0) or radix tree 108 (e.g., type=1), and may be based on the type of application or memory access that issued the effective address. For a SLB entry with the type field 111B equal to 0, indicating a search of HPT 107, the address field 111A includes a virtual address corresponding to the matching effective address; the virtual address is searched in the TLB 106 and HPT 107. For a SLB entry with the type field 111B equal to 1, indicating a search of radix tree 108, the address field 111A includes effective address and address space ID information, which is searched in the TLB 106 and the radix tree 108. The address space ID in address field 111A may comprise a PID, and may be an external PID, in various embodiments. The radix tree 108 includes various levels, each denoting different sized segments of memory in the computing system. Top-level 256 terabyte (TB) segment 112 has various 512 gigabyte (GB) sub-segments 113A-N; 512 GB sub-segment 113A has various 1 GB sub-segments 114A-N; and 1 GB sub-segment 114A has 2 megabyte (MB) sub-segment 115. The effective address and address space ID information included in address field 111A for a type 1 SLB entry are used to determine a level at which to start a search of radix tree 108. The segments 112, 113A-N, 114A-N, and 115A are shown for illustrative purposes only; a radix tree such as radix tree 108 may include any appropriate number, and size, and structure of segments and sub-segments.

Figure 2:
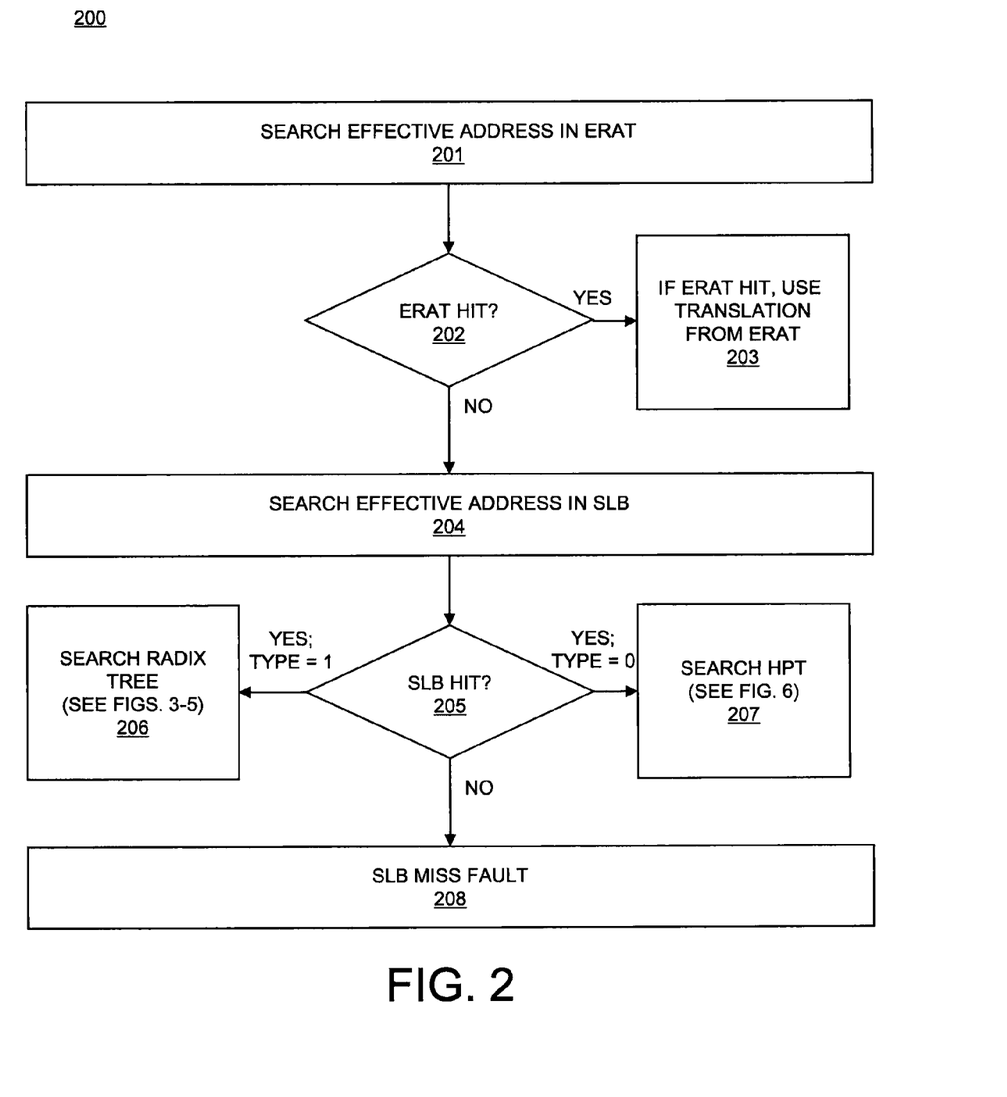
FIG. 2 depicts a process flow of a method for hybrid address translation in accordance with an embodiment.

FIG. 2 depicts a process flow of a method 200 for hybrid address translation in accordance with an embodiment. FIG. 2 is discussed with respect to FIGS. 1A-B, and may be implemented in address translation logic 103. First, in block 201, an effective address to be translated that was issued by one of applications 102A-N is searched in the ERAT cache 104. It is then determined in block 202 if the effective address was found in the ERAT cache 104. If the effective address is in the ERAT cache 104, then, in block 203, the translation from the ERAT cache 104 is used to access main memory 109, and flow of method 200 ends. However, if the effective address is not in the ERAT cache 104, then, in block 204, the address is searched in SLB 105, and it is determined in block 205 if an SLB entry exists in the SLB 105 for the effective address. If an SLB entry 110 for the effective address is found in the SLB 105, it is then determined if the type field 111B associated with that the effective address indicates a radix tree search or a HPT search. If the type field 111B indicates a radix tree search, then flow proceeds from block 205 to block 206, and the TLB 106 and radix tree 108 are searched for the effective address and address space ID associated with the effective address as indicated by address field 111A; this is discussed in further detail with respect to FIGS. 3-5. If the type field 111B for the effective address indicates a HPT search, then flow proceeds from block 205 to block 207, and the TLB 106 and HPT 107 are searched for the virtual address associated with the effective address as indicated by address field 111A; this is discussed in further detail with respect to FIG. 6. If it is determined in block 205 that there is not an SLB entry for the effective address in the SLB 105, a SLB miss fault is issued in block 208 and flow of method 200 ends.

Figure 3:
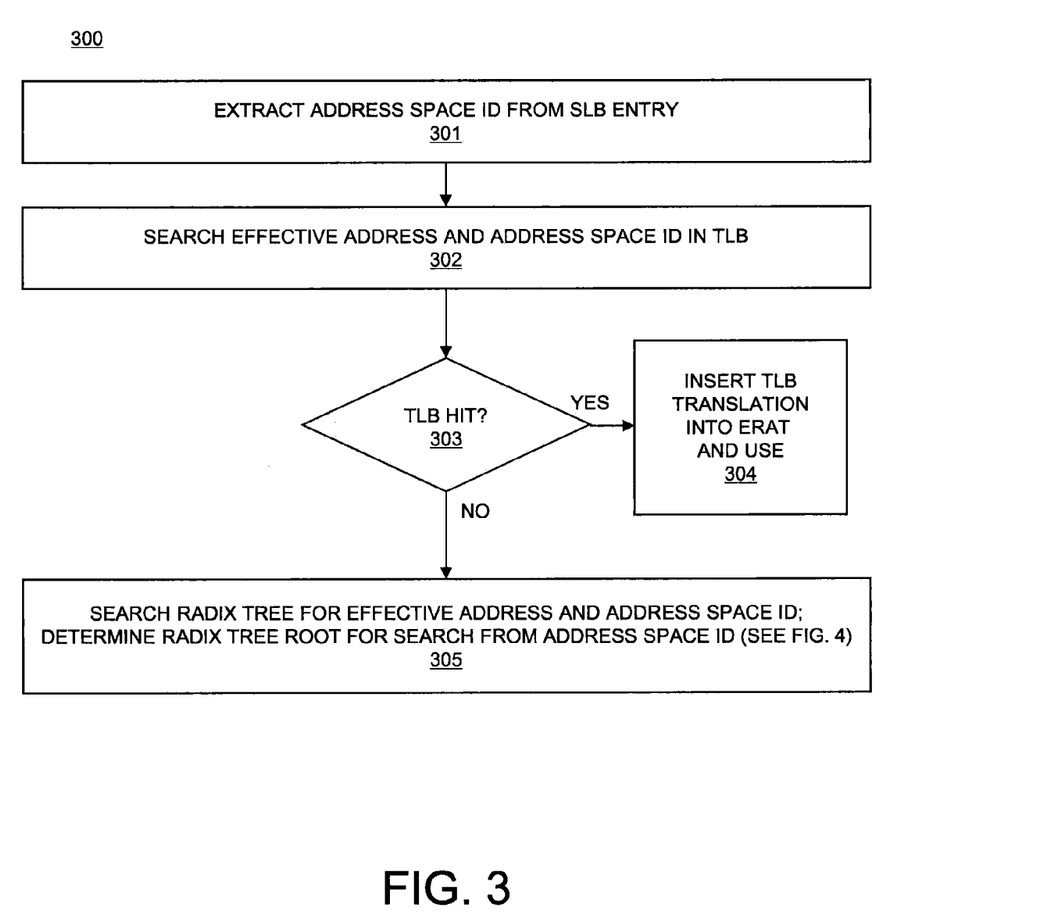
FIGS. 3-5 depict a process flow of a method for searching a radix tree in accordance with an embodiment.

FIG. 3 depicts a process flow of a method 300 for a radix tree search in accordance with an embodiment. Method 300 is performed by address translation logic 103 during block 206 of method 200 of FIG. 2 if the type field in the type field 111B in the SLB entry 110 associated with the effective address indicates a radix tree search. First, in block 301, the address space ID for the effective address is extracted from the address field 111A in the SLB entry 110. Then, in block 302, TLB 106 is searched for the effective address and the address space ID associated with the effective address. It is then determined if the effective address and address space ID are in the TLB 106 in block 303. If the effective address and address space ID are in the TLB 106, the real address translation given for the effective address in the TLB 106 is inserted in the ERAT cache 104 and used to access main memory 109 in block 304. However, if the effective address and address space ID are determined not to be in the TLB in block 303, flow proceeds to block 305, in which the radix tree 108 is searched for the effective address, and the address space ID is used to determine a root of the radix tree search.

Figure 4:
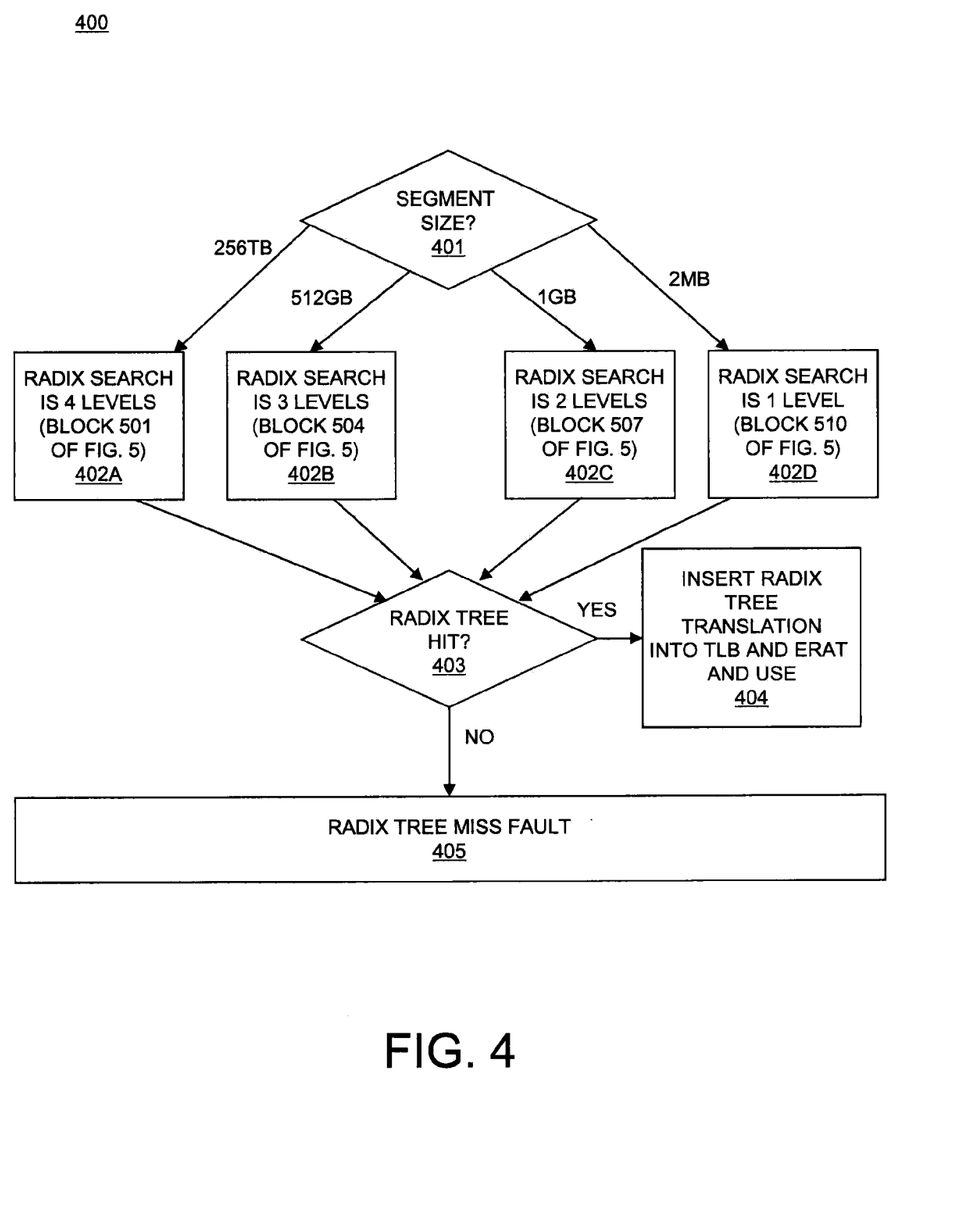

Searching the radix tree 108 as is performed in block 306 of method 300 is discussed in further detail with respect to FIG. 4, which is performed by address translation logic 103 and depicts a process flow of a method 400 for a radix tree search for an effective address using an address space ID as a root of the search, in accordance with an embodiment. First, in block 401, a size of the block of entries associated with the address space ID is determined. The size of the block of entries, also referred to as a segment size, indicated by the address space ID indicates the level at which to begin the search of radix tree 108. A larger segment size indicates a higher level and a radix tree search having a larger number of steps, while a smaller segment size indicates a lower level and a radix tree search having a smaller number of steps. As shown in FIG. 4, a segment size of 256 TB indicates a 4-level radix tree search in block 402A; a segment size of 512 GB indicates a 3-level radix tree search in block 402B; a segment size of 1 GB indicates a 2-level radix tree search in block 402B; and a segment size of 2 MB indicates a 1-level radix tree search in block 402D; however, the segment sizes and number of levels shown in FIG. 4 are shown for illustrative purposes only, and may vary based on the structure of the radix tree being searched.

Figure 5:
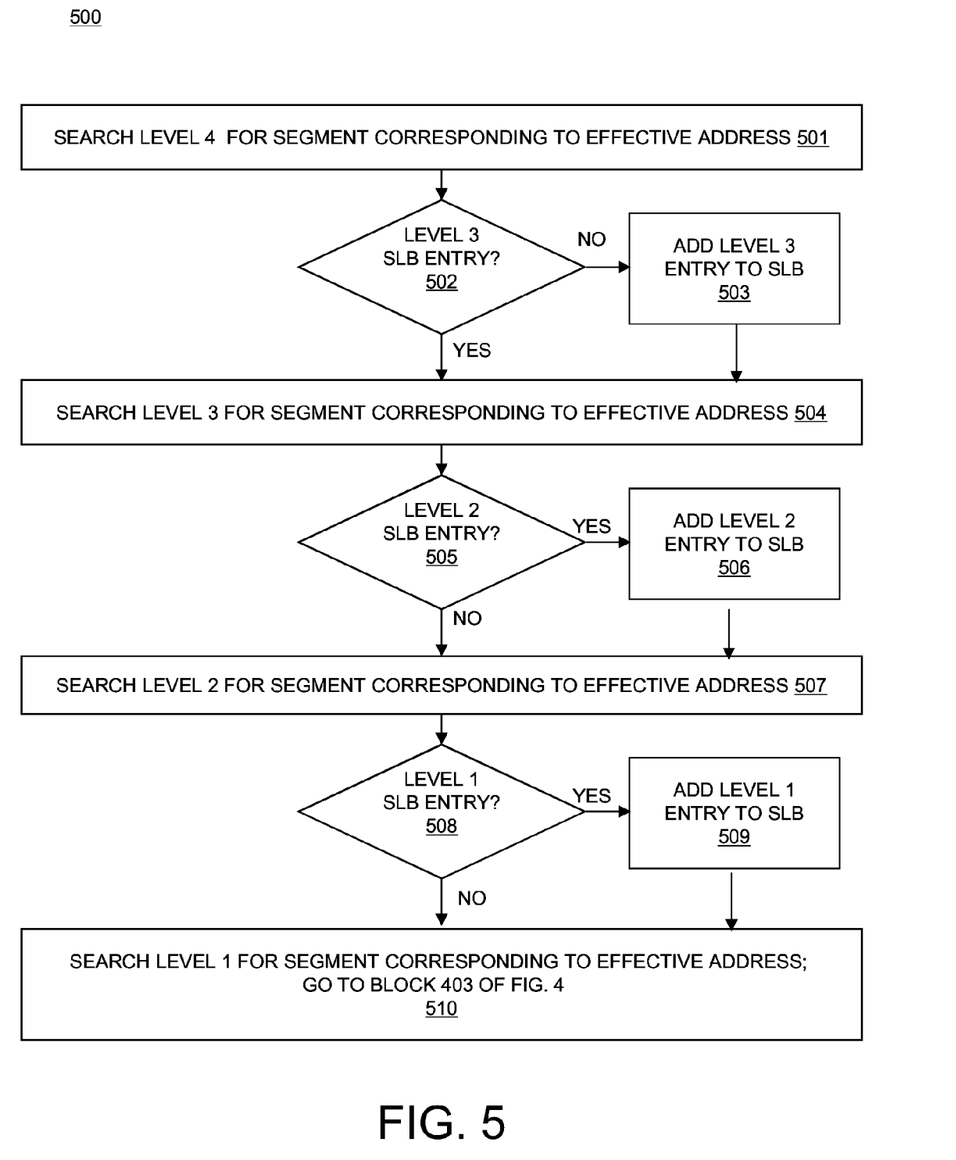

The radix tree 108 is searched for the effective address starting at the level indicated by the determined segment size in blocks 402A-D; this is discussed in further detail with respect to FIG. 5. FIG. 5 depicts a process flow of a method 500 for a radix tree search in accordance with an embodiment. The radix tree search illustrated by method 500 may begin at any of blocks 501, 504, 507, or 510, depending on the segment size that was determined in block 401 of FIG. 4. A 4-level radix search, as indicated by block 402A of FIG. 4, begins at block 501; this corresponds to starting the search at the level of segment 112 of radix tree 108 of FIG. 1B. A 3-level radix search, as indicated by block 402B of FIG. 4, begins at block 504; this corresponds to starting the search at the level of segments 113A-N of radix tree 108 of FIG. 1B. A 2-level radix search, as indicated by block 402C of FIG. 4, begins at block 507; this corresponds to starting the search at the level of segments 114A-N of radix tree 108 of FIG. 1B. A 1-level radix search, as indicated by block 402D of FIG. 4, begins at block 510; this corresponds to starting the search at the level of segment 115 of radix tree 108 of FIG. 1B. Starting the search at the lowest level in the radix tree that is indicated by the segments size associated with the address space ID of the effective address may reduce the number of steps required to search the radix tree, thereby expediting the translation of the effective address.

Flow of method 500 of FIG. 5 is now discussed. First, in block 501, the fourth (highest) level of the radix tree 108 is searched for the effective address to find a smaller matching segment in the third level of the radix tree 108. It is then determined in block 502 if a SLB entry for the smaller matching segment in the third level of the radix tree 108 for the effective address exists in the SLB 105. If the SLB entry for the smaller matching segment in the third level exists in the SLB, then flow proceeds to block 504; otherwise, a SLB entry for the smaller matching segment in the third level is added to the SLB in block 503, and flow proceeds to block 504. In block 504, the smaller matching segment in the third level that was determined in block 501 is searched for the effective address to find a smaller matching segment in the second level. It is then determined in block 505 if a SLB entry for the smaller matching segment in the second level exists in the SLB 105. If the SLB entry for the smaller matching segment in the second level exists in the SLB 105, then flow proceeds to block 507; otherwise, a SLB entry for the smaller matching segment is added to the SLB 105 in block 506, and flow proceeds to block 507. In block 507, the smaller matching segment in the second level of the radix tree 108 that was determined in block 504 is searched for the effective address to determine a smaller matching segment in the first level of the radix tree. It is then determined in block 508 if a SLB entry for the smaller matching segment in the first level exists in the SLB 105. If the SLB entry for the smaller matching segment in the first level exists in the SLB 105, then flow proceeds to block 510; otherwise, a SLB entry for the smaller matching segment in the first level is added to the SLB 105 in block 509, and flow proceeds to block 510. In block 510, the smaller matching segment in the first level that was determined in block 507 is searched for the effective address, at which point searching of the radix tree 108 as is described by method 500 of FIG. 5 is completed, and flow returns to block 403 of method 400 of FIG. 4.

Returning again to FIG. 4, flow proceeds to block 403, in which is it is determined if there was a hit in the radix tree 108 during the search that was performed during method 500 of FIG. 5. If it is determined that there was a hit for the effective address in the radix tree 108 in block 403, then flow proceeds to block 404, and the translation given for the effective address by the radix tree 108 is inserted in the TLB 106 and the ERAT cache 104 and used to access main memory 109 in block 404, and flow of method 400 ends. If there is determined not to be a radix tree hit in block 403, then a radix tree miss fault is given in block 405, and flow of method 400 ends. The radix tree search that is applied to effective addresses having a type field 111B that indicates a radix tree search is thereby completed.

Figure 6:
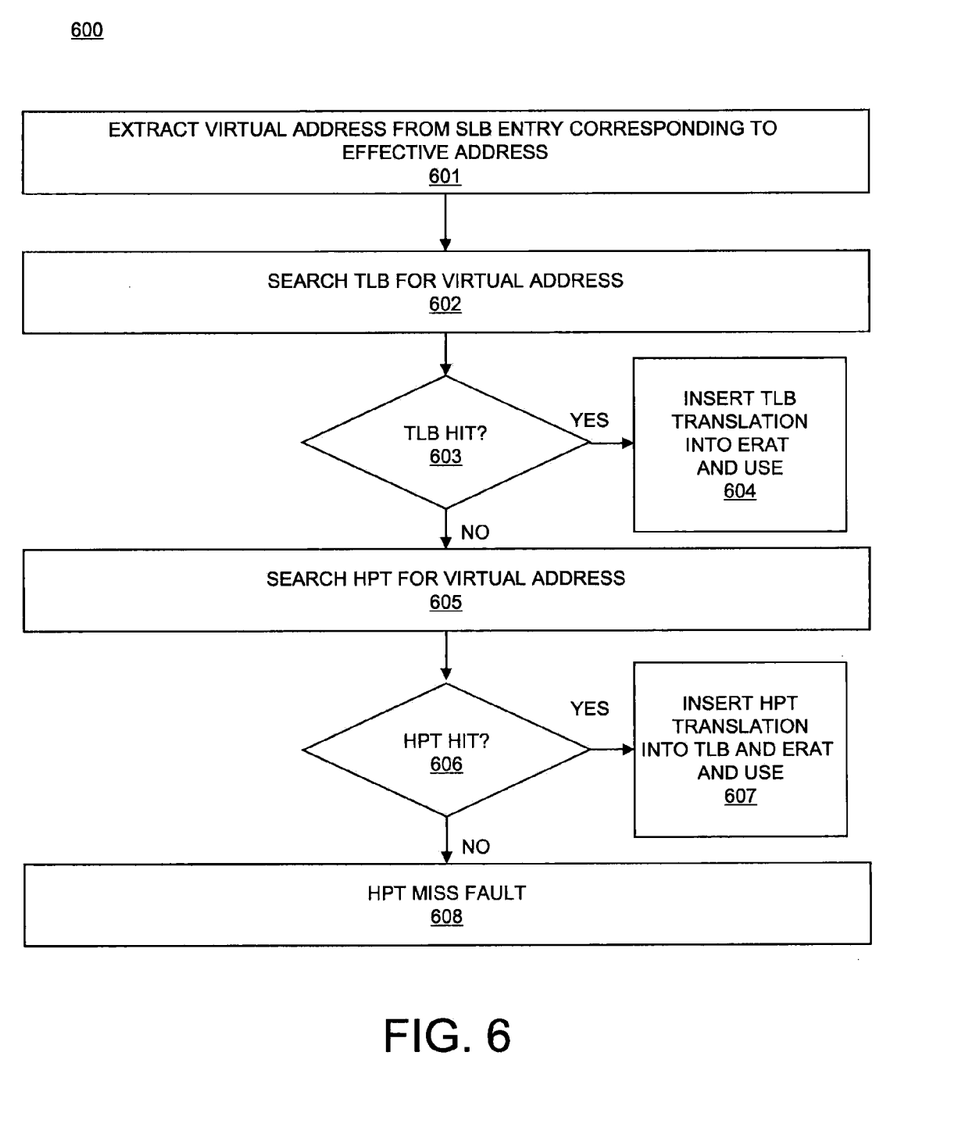
FIG. 6 depicts a process flow of a method for searching a hashed page table in accordance with an embodiment.

FIG. 6 depicts a process flow of a method 600 for a HPT search in accordance with an embodiment. Method 600 is performed by address translation logic 103 during block 207 of method 200 of FIG. 2 if the type field 111B in the SLB entry 110 indicates an HPT search. First, in block 601, a virtual address corresponding to the effective address is extracted from the address field 111A of the SLB entry 110 associated with the effective address in the SLB 105. Then, in block 602, the TLB 106 is searched for the virtual address. It is then determined if the virtual address was found in the TLB 106 in block 603. If the virtual address was found in the TLB 106, the translation given for the virtual address by the TLB 106 is inserted in the ERAT cache 104 and used for the memory access in block 604, and flow of method 600 ends. If the virtual address is not in the TLB, flow proceeds to block 605, in which the HPT 107 is searched for the virtual address. The HPT 107 may be searched using any appropriate method. It is then determined if the virtual address was found in the HPT 107 in block 606. If the virtual address was found in the HPT 107, the translation given for the virtual address by the HPT 107 is inserted in the TLB 106 and ERAT cache 104 and used for to access main memory 109 in block 607, and flow of method 600 ends. Otherwise, a HPT miss fault is issued in block 608, and flow of method 600 ends.

Figure 7:
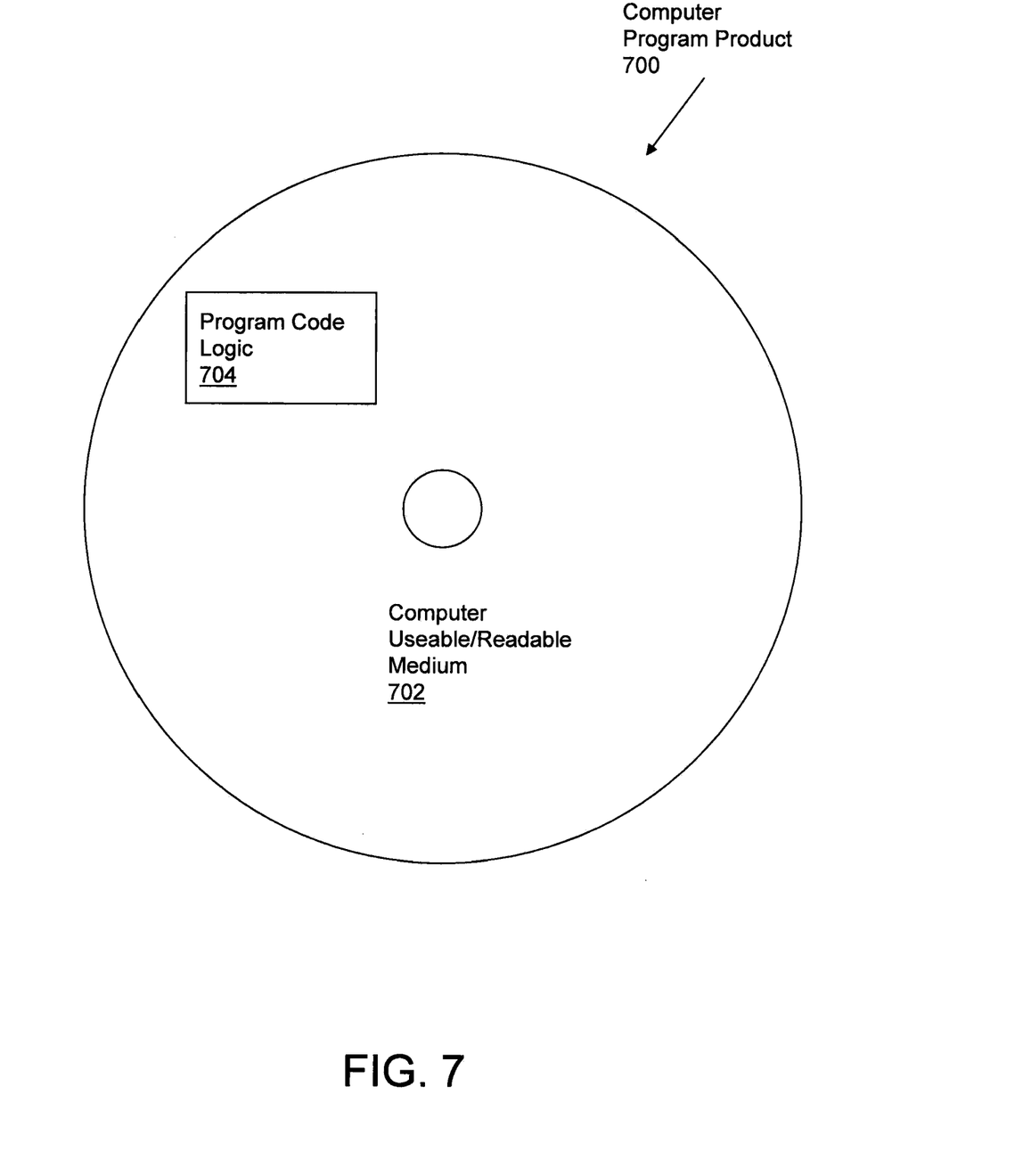
FIG. 7 illustrates a computer program product in accordance with an embodiment.

As described above, embodiments can be embodied in the form of computer-implemented processes and apparatuses for practicing those processes. An embodiment may include a computer program product 700 as depicted in FIG. 7 on a computer readable/usable medium 702 with computer program code logic 704 containing instructions embodied in tangible media as an article of manufacture. Exemplary articles of manufacture for computer readable/usable medium 702 may include floppy diskettes, CD-ROMs, hard drives, universal serial bus (USB) flash drives, or any other computer-readable storage medium, wherein, when the computer program code logic 704 is loaded into and executed by a computer, the computer becomes an apparatus for practicing the invention. Embodiments include computer program code logic 704, for example, whether stored in a storage medium, loaded into and/or executed by a computer, or transmitted over some transmission medium, such as over electrical wiring or cabling, through fiber optics, or via electromagnetic radiation, wherein, when the computer program code logic 704 is loaded into and executed by a computer, the computer becomes an apparatus for practicing the invention. When implemented on a general-purpose microprocessor, the computer program code logic 704 segments configure the microprocessor to create specific logic circuits.

Technical effects and benefits include improved performance for different types of memory accesses and/or applications running on a computing system through use of different address translation search schemes, as appropriate.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or schematic diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As described above, embodiments can be embodied in the form of computer-implemented processes and apparatuses for practicing those processes. In embodiments, the invention is embodied in computer program code executed by one or more network elements. Embodiments include a computer program product on a computer usable medium with computer program code logic containing instructions embodied in tangible media as an article of manufacture. Exemplary articles of manufacture for computer usable medium may include floppy diskettes, CD-ROMs, hard drives, universal serial bus (USB) flash drives, or any other computer-readable storage medium, wherein, when the computer program code logic is loaded into and executed by a computer, the computer becomes an apparatus for practicing the invention. Embodiments include computer program code logic, for example, whether stored in a storage medium, loaded into and/or executed by a computer, or transmitted over some transmission medium, such as over electrical wiring or cabling, through fiber optics, or via electromagnetic radiation, wherein, when the computer program code logic is loaded into and executed by a computer, the computer becomes an apparatus for practicing the invention.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer implemented method for hybrid address translation in a computer, the method comprising:
receiving a first address, the first address comprising an effective address referencing a location in a first address space in a computer system comprising a first page table comprising a hashed page table (HPT), and a second page table comprising a radix tree;
searching a segment lookaside buffer (SLB) for an SLB entry corresponding to the first address, the SLB comprising a plurality of SLB entries each comprising a respective type field and a respective address field, the plurality of SLB entries comprising a first entry comprising a first type field corresponding to a search of the first page table comprising the HPT, and a second entry comprising a second type field corresponding to a search of the second page table comprising the radix tree;
determining whether a value of the type field in the SLB entry corresponding to the first address corresponds to a search of the first page table comprising the HPT or a search of the second page table comprising the radix tree; and
searching one of the first and second page tables to determine an address translation for the first address based on the type field in the SLB entry corresponding to the first address by:
based on determining that the value of the type field corresponds to the search of the first page table comprising the HPT, searching the first page table comprising the HPT to determine a second address, the second address comprising a translation of the first address into a second address space; and
based on determining that the value of the type field corresponds to the search of the second page table comprising the radix tree, searching the second page table comprising the radix tree to determine the second address.

2. The method of claim 1, wherein the address field of the first entry in the SLB comprises a virtual address corresponding to an effective address, and wherein searching the first page table to determine the second address comprises:
extracting the virtual address associated with the first address from the address field of the SLB entry corresponding to the first address; and
searching the first page table for the virtual address.

3. The method of claim 1, wherein the address field of the second entry in the SLB comprises an address space identifier (ID) and a segment size corresponding to an effective address, and wherein searching the second page table to determine the second address comprises:
extracting the address space ID and the segment size associated with the first address from the address field of the SLB entry corresponding to the first address;
determining a root of the search of the second page table comprising the radix tree based on the address space ID and the segment size; and
searching the second page table for the first address starting at the root.

4. The method of claim 3, wherein the address space ID comprises a process ID associated with the first address.

5. The method of claim 3, wherein the address space ID and the segment size indicate that the root is a level in the radix tree that is below a top level of the radix tree, and wherein the search of the radix tree for the first address starts at the level that is below the top level of the radix tree, such that the top level of the radix tree is not searched.

6. The method of claim 1, wherein the first address comprises an effective address issued by an application running on a computer as part of a memory access, and wherein the second address comprises a real address, and the second address space comprises a physical computer memory of the computer.

7. The method of claim 1, wherein the value of the type field is based on at least one of a type of memory access and a type of application associated with the first address.

8. The method of claim 1, wherein the first address space comprises a plurality of discontiguous memory regions.

\* \* \* \* \*